United States Patent [19]

Jenkins

[11] Patent Number: 5,484,163
[45] Date of Patent: Jan. 16, 1996

[54] VEHICLE OCCUPANT RESTRAINT APPARATUS

[75] Inventor: Jeffrey A. Jenkins, Shelby Township, Mich.

[73] Assignee: TRW Vehicle Safety Systems Inc., Lyndhurst, Ohio

[21] Appl. No.: 197,734

[22] Filed: Feb. 17, 1994

[51] Int. Cl.$^6$ .................................................. B00R 21/20
[52] U.S. Cl. ........................................ 280/728.2; 280/732
[58] Field of Search .......................... 280/728 R, 728 A, 280/728 B, 732, 737, 736, 740; 220/601, 676

[56] References Cited

U.S. PATENT DOCUMENTS

| | | |
|---|---|---|
| 4,842,300 | 6/1989 | Ziomek et al. . |
| 4,915,410 | 4/1990 | Bachelder . |
| 5,062,664 | 11/1991 | Bishop et al. . |
| 5,087,067 | 2/1992 | Seki et al. ............... 280/728 A |
| 5,088,764 | 2/1992 | Augustitus et al. . |
| 5,121,941 | 6/1992 | Mihm et al. ............. 280/728 A |
| 5,137,680 | 7/1992 | Coultas et al. ............. 280/737 |

Primary Examiner—Karin L. Tyson
Attorney, Agent, or Firm—Tarolli, Sundheim & Covell

[57] ABSTRACT

An air bag module (18) includes an inflator (14) and a reaction canister (16). The inflator (14) has an elongated container wall (108) with first and second longitudinally opposite end portions. The inflator (14) also has a nozzle (102) located adjacent to the first end portion of the container wall (108). An outer portion (24) of the reaction canister (16) defines an outer compartment (42) containing an air bag (12). The outer portion (24) of the reaction canister (16) has first and second side walls (34, 36) defining respective opposite ends of the outer compartment (42). An inner portion (26) of the reaction canister (16) contains the nozzle (102) and the first end portion of the container wall (108). A side wall (64) of the inner portion (26) of the reaction canister (16) has an opening (86) which is located intermediate the side walls (34, 36) of the outer portion (24). The container wall (108) extends longitudinally through the opening (86) from the inner compartment (88) to the exterior of the reaction canister (16). The second end portion of the container wall (108) is located outside of the reaction canister (16).

12 Claims, 3 Drawing Sheets

VEHICLE OCCUPANT RESTRAINT APPARATUS

FIELD OF THE INVENTION

The present invention relates to a vehicle occupant restraint apparatus, and particularly relates to a vehicle occupant restraint apparatus including an inflatable vehicle occupant restraint such as an air bag.

BACKGROUND OF THE INVENTION

An inflatable vehicle occupant restraint, such as an air bag, is inflated upon the occurrence of a vehicle collision. Inflation fluid is directed to flow from a source of inflation fluid into the air bag to inflate the air bag. The inflation fluid inflates the air bag from a folded, stored condition to an inflated condition in which the air bag extends into the vehicle occupant compartment. When the air bag is inflated into the vehicle occupant compartment, it restrains an occupant of the vehicle from forcefully striking parts of the vehicle.

The air bag is part of an air bag module which is mounted in the vehicle. The air bag module includes a reaction canister which contains the air bag in the stored condition. The reaction canister has parts for fastening the air bag module to the vehicle, and supports the source of inflation fluid adjacent to the air bag. The reaction canister also has a deployment opening through which the air bag emerges when it is inflated. A deployment door covers the deployment opening in the reaction canister. The deployment door is opened out of the path of movement of the air bag when the air bag is inflated outward from the reaction canister and into the vehicle occupant compartment.

SUMMARY OF THE INVENTION

In accordance with the present invention, an apparatus is provided for supporting an inflatable vehicle occupant restraint and an inflator structure in a vehicle. The inflator structure has an elongated container wall with first and second longitudinally opposite end portions. The inflator structure further has a nozzle for directing inflation fluid from the inflator structure to inflate the vehicle occupant restraint. The nozzle is located adjacent to the first end portion of the container wall.

The apparatus for supporting the vehicle occupant restraint and the inflator structure in a vehicle comprises a canister. An outer portion of the canister includes means for defining an outer compartment for receiving the vehicle occupant restraint. The outer portion of the canister has first and second side walls defining respective opposite ends of the outer compartment. An inner portion of the canister includes means for defining an inner compartment. The inner portion of the canister has first and second side walls defining respective opposite ends of the inner compartment.

The canister further includes means for supporting the inflator structure with the nozzle and the first end portion of the container wall being located in the inner compartment, and with the second end portion of the container wall being located outside of the canister. The means for supporting the inflator structure defines an opening through which the container wall can extend longitudinally from the inner compartment to the exterior of the canister. The opening extends through the second side wall of the inner portion of the canister, and is located intermediate the side walls of the outer portion of the canister.

In a preferred embodiment of the present invention, the inflator structure and the canister are parts of an air bag module which is mounted in a vehicle, such as in the instrument panel of the vehicle. The inflator structure includes a pressure vessel which contains inflation fluid under pressure. The elongated container wall is a part of the pressure vessel.

The pressure vessel supports a pressure switch for detecting leakage of the inflation fluid from the pressure vessel. The pressure switch extends into the pressure vessel from an end wall of the pressure vessel, and has a pair of electrical connector pins which are exposed at the outer side of the end wall. The end wall of the pressure vessel and the pressure switch are both located within the end portion of the container wall which is located outside of the canister. Therefore, the canister does not substantially block manual access to the connector pins at the outer side of the end wall. As a result of this feature of the present invention, a great degree of manual access is provided for manual connection of the pressure switch in an electrical circuit when the air bag module is mounted in the vehicle instrument panel.

BRIEF DESCRIPTION OF THE DRAWINGS

The foregoing and other features of the present invention will become apparent to those skilled in the art to which the present invention relates upon reading the following description of the invention with reference to the accompanying drawings, in which.

DESCRIPTION OF A PREFERRED EMBODIMENT

Figure 1:
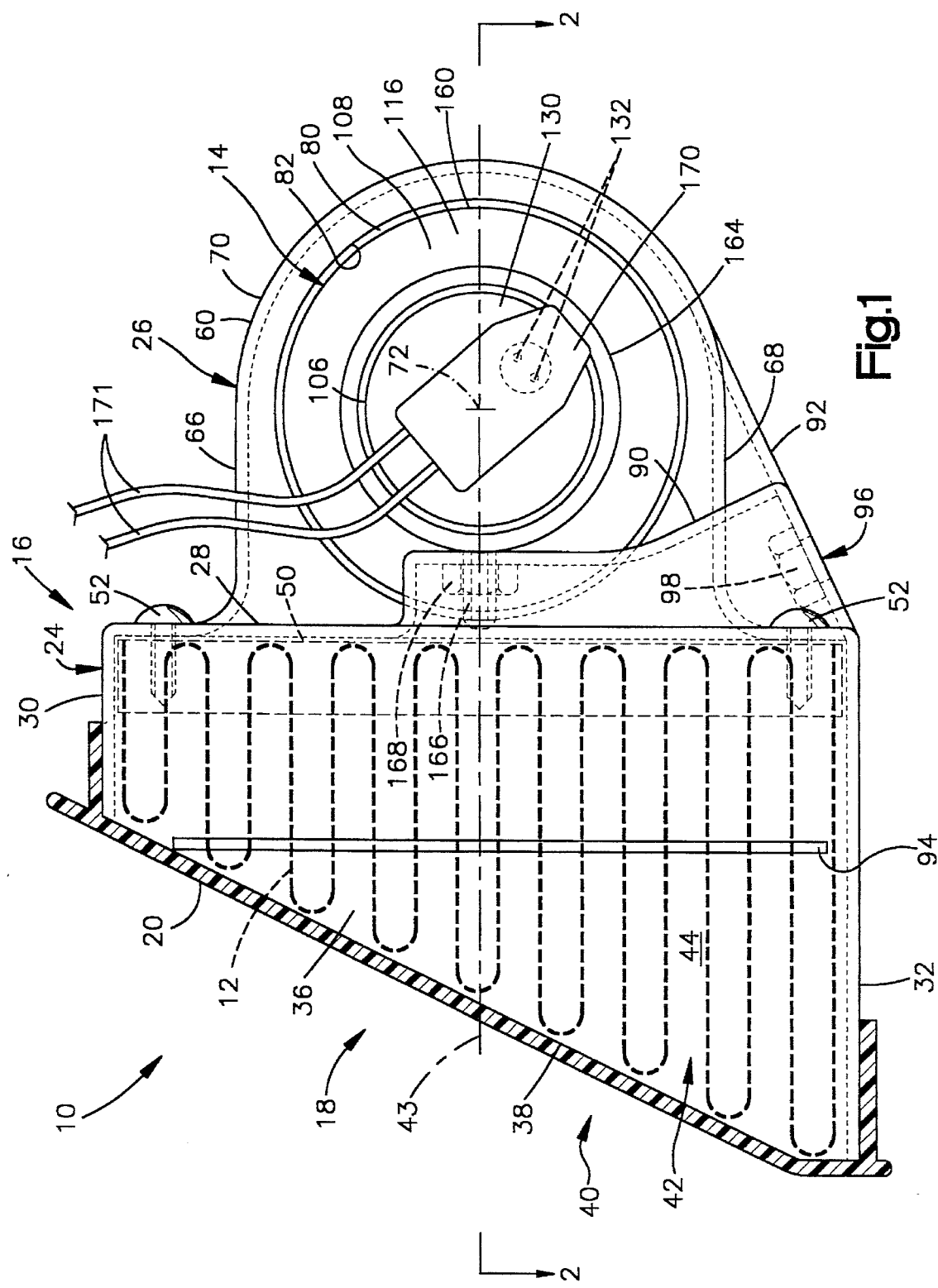
FIG. 1 is a view of a vehicle occupant restraint apparatus comprising a preferred embodiment of the present invention, showing certain parts of the apparatus schematically.

A vehicle occupant restraint apparatus 10 comprising a preferred embodiment of the present invention is shown in FIG. 1. The apparatus 10 includes an inflatable vehicle occupant restraint 12, which is commonly referred to as an air bag, and an inflator 14. The inflator 14 comprises a source of inflation fluid for inflating the air bag 12. A reaction canister 16 contains the air bag 12 and supports the inflator 14. The air bag 12, the inflator 14 and the reaction canister 16 are parts of an air bag module 18 which is mounted in a vehicle, such as in the instrument panel of the vehicle. The air bag module 18 further includes a deployment door 20 which conceals the other parts of the module 18 from the vehicle occupant compartment when the module 18 is mounted in the vehicle.

When the vehicle experiences a collision for which inflation of the air bag 12 is desired to restrain an occupant of the vehicle, the inflator 14 is actuated. The inflator 14 then provides inflation fluid which is directed into the air bag 12 to inflate the air bag 12. As the air bag 12 begins to inflate, it moves forcefully against the deployment door 20. A stress riser (not shown) in the deployment door 20 ruptures under the stress induced by the pressure of the inflation fluid in the air bag 12. As the air bag 12 continues to inflate, it moves outward from the reaction canister 16 past the ruptured deployment door 20 and into the vehicle occupant compartment to restraint movement of an occupant of the vehicle.

The reaction canister 16 has an outer canister portion 24 and an inner canister portion 26. The outer canister portion 24 has a base wall 28, a rectangular upper wall 30, and a rectangular lower wall 32. The outer canister portion 24 further has first and second opposite side walls 34 and 36. A peripheral edge surface 38 of the outer canister portion 30 defines a deployment opening 40 which is covered by the deployment door 20.

Figure 2:
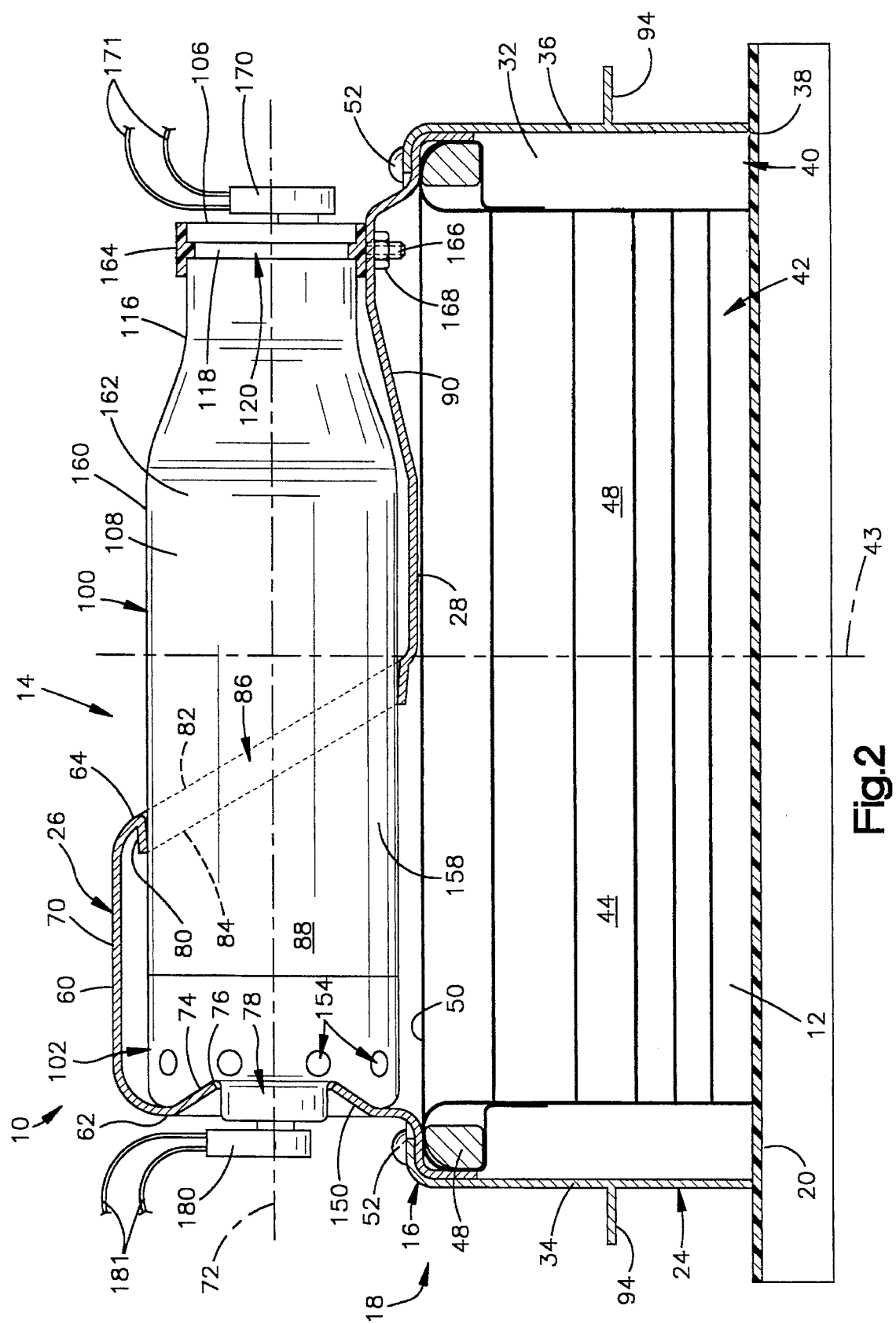
FIG. 2 is a view taken on line 2—2 of FIG. 1.

The walls 28, 30, 32, 34 of the outer canister portion 24 define an outer compartment 42 in the reaction canister 16. The outer compartment 42 extends vertically between the upper and lower walls 30 and 32, and extends horizontally between the base wall 28 and the deployment opening 40. As shown in FIG. 2, the outer compartment 42 also extends horizontally between the opposite side walls 34 and 36, and is elongated between the opposite side walls 34 and 36. A transverse center line 43 of the outer canister portion 24 extends from the base wall 28 toward the deployment opening 40 midway between the opposite side walls 34 and 36. A first section 44 of the outer compartment 42 is located on a first side of the transverse center line 43. A second section 48 of the outer compartment 42 is located on a second side of the transverse center line 43.

The air bag 12 is contained in the outer compartment 42 in the reaction canister 16. An air bag retainer 48 is attached to the air bag and is located adjacent to an open end portion 50 of the air bag 12 in a known manner. The air bag retainer 48 is closely received in the outer compartment 42 adjacent to the base wall 28, and is fixed to the base wall 28 by a plurality of fasteners 52. The air bag retainer 48 and the fasteners 52 thus secure the air bag 12 to the reaction canister 16. As noted above, the deployment door 20 covers the deployment opening 40, and thus covers the air bag 12 in the outer compartment 42.

The inner canister portion 26 has a major wall 60, a first side wall 62, and a second side wall 64. The major wall 60 has a flat, horizontal upper portion 66, and has a flat, horizontal lower portion 68. An arcuate portion 70 of the major wall 60 extends between the upper and lower portions 66 and 68 in an arc which is centered on an axis 72 of the inner canister portion 26. The axis 72 is perpendicular to the transverse center line 43 of the outer canister portion 24.

The first side wall 62 of the inner canister portion 26 has a frustoconical inner surface 74 centered on the axis 72. An annular inner edge surface 76 of the first side wall 62 defines a circular opening 78 centered on the axis 72.

The second side wall 64 extends transversely relative to the axis 72 at an acute angle, and most preferably at an angle of 45°. Since the axis 72 is perpendicular to the transverse center line 43, the second side wall 64 likewise extends at an acute angle relative to the transverse center line 43. A lip portion 80 of the second side wall 64 is folded inwardly of the reaction canister 16. The lip portion 80 has an elliptical outer edge surface 82 and an elliptical inner edge surface 84. The lip portion 80 thus defines an elliptical opening 86 extending through the second side wall 64.

The walls 60, 62 and 64 of the inner canister portion 26 define an inner compartment 88 in the reaction canister 16. As shown in FIG. 2, the side walls 62 and 64 of the inner canister portion 26 are both located intermediate the first and second side walls 34 and 36 of the outer canister portion 24. The first side wall 62 of the inner canister portion 26 is spaced from the first side wall 34 of the outer canister portion 24 only a relatively short distance along the axis 72. However, the second side wall 64 of the inner canister portion 26 is spaced from the second side wall 36 of the outer canister portion 24 a relatively long distance along the axis 72. In the preferred embodiment of the invention shown in the drawings, the second side wall 64 is spaced sufficiently from the second side wall 36 so as to be located entirely on the first side of the transverse center line 43 of the outer canister portion 24. Accordingly, the inner compartment 88 also is located entirely on the first side of the transverse center line 43.

In the preferred embodiment of the present invention shown in the drawings, the inner and outer portions 26 and 24 of the reaction canister 16 are defined by separate pieces of deep drawn sheet metal that are connected to each other by the fasteners 52. However, the reaction canister 16 could alternatively be constructed with the inner and outer portions 26 and 24 being defined by one continuous metal piece. Such a continuous metal piece could be a piece of deep drawn sheet metal or a piece of die cast metal.

The reaction canister 16 further includes parts for receiving fasteners (not shown) which fasten the reaction canister 16 to the vehicle instrument panel in which the air bag module 18 is mounted. Such parts of the reaction canister 16 include a first mounting wall portion 90, a second mounting wall portion 92, and a pair of mounting brackets 94. The first mounting wall portion 90 projects from the base wall 28 at a location adjacent to the second side wall 36 of the outer canister portion 24, and has an aperture 96 (FIG. 1) at its lower end. A nut 98 is welded to the inside surface of the first mounting wall portion 90, and is aligned with the aperture 96 so as to receive a threaded fastener inserted through the aperture 96. The second mounting wall portion 92 is located beneath the inner canister portion 26 at the opposite end of the reaction canister 16, and is similarly constructed to receive a threaded fastener through an aperture and a nut (not shown). Each of the mounting brackets 94 projects from a respective one of the first and second side walls 34 and 36 of the outer canister portion 24, and has apertures (not shown) for receiving fasteners.

Figure 3:
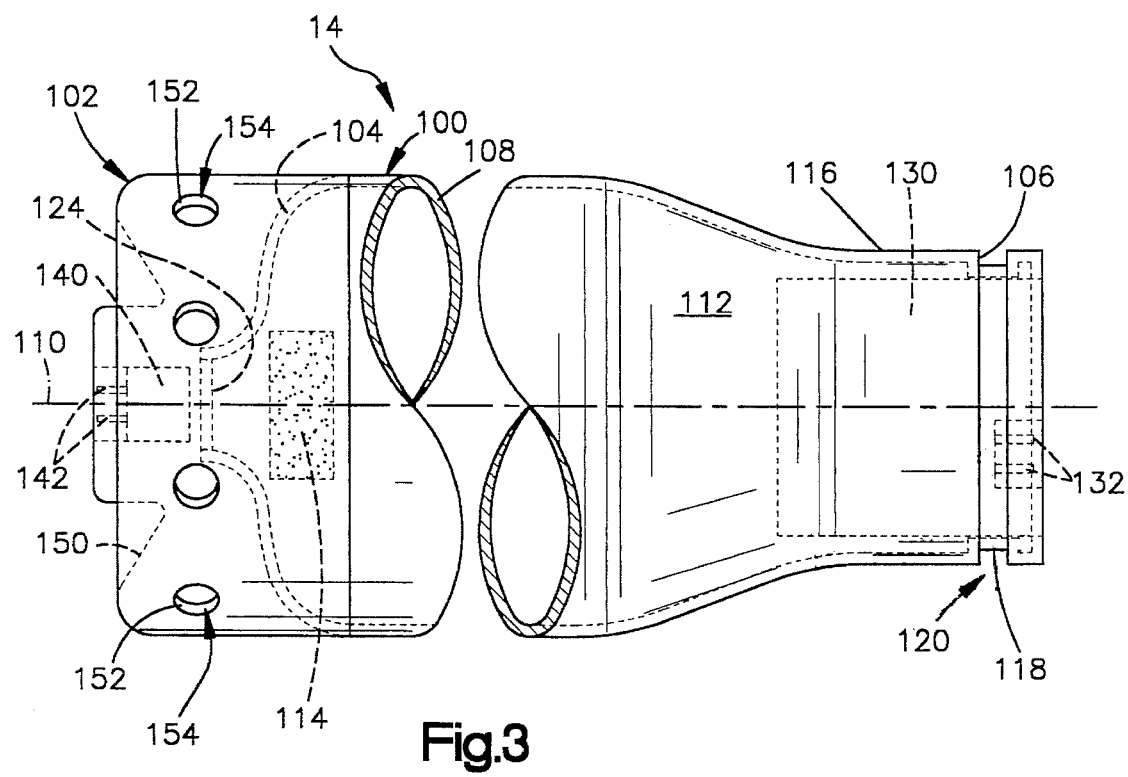
FIG. 3 is an enlarged view of parts of the apparatus of FIG. 1, also showing certain parts schematically.

As shown in detail in FIG. 3, the inflator 14 includes a pressure vessel 100 and a nozzle structure 102. The pressure vessel 100 has a first end wall 104, a second end wall 106, and a generally cylindrical container wall 108, each of which is centered on a longitudinal central axis 110 of the pressure vessel 100. The walls 104, 106 and 108 of the pressure vessel 100 define a generally cylindrical storage chamber 112 which extends longitudinally within the container wall 108 between the end walls 104 and 106.

An inflation fluid, preferably consisting essentially of argon gas, is contained under pressure in the storage chamber 112. Also contained in the storage chamber 112 is ignitable material, shown schematically in FIG. 3 as a body of ignitable gas generating material 114. When the gas generating material 114 is ignited, it produces combustion products which heat and supplement the inflation fluid contained in the storage chamber 112 and which thus raise the pressure of the inflation fluid. The gas generating material 114 may have any suitable composition known in the art.

The container wall 108 of the pressure vessel 100 has a reduced diameter section 116 extending from the second end wall 106. A recessed surface portion 118 of the container wall 108 defines a groove 120 extending circumferentially around the reduced diameter section 116 at a location spaced a short distance from the second end wall 106.

The first end wall 104 of the pressure vessel 100 is shaped as a neck of the pressure vessel 100. A rupturable closure portion 124 of the first end wall 104 is centered on the axis 110, and is rupturable to release the inflation fluid to exit the storage chamber 112. The closure portion 124 may be constructed as known in the art, and may thus comprise a burst disk.

A pressure switch 130 is supported by the second end wall 106 of the pressure vessel 100. The pressure switch 130 extends into the storage chamber 112 through the second end wall 106, and has a pair of electrical connector pins 132 which are exposed at the outer side of the second end wall 106. The pressure switch 130 operates to detect leakage of the inflation fluid from the storage chamber 112 by sensing the fluid pressure in the storage chamber 112, and by closing to complete an electrical current path between the connector pins 132 when the fluid pressure drops to a predetermined low level. Such pressure switches are known in the art. For example, one such pressure switch is available from TRW Technar Inc. as part No. 1200894A.

The nozzle structure 102 is received over the first end wall 104 of the pressure vessel 100. The nozzle structure 102 supports a squib 140 in a position centered on the axis 110 adjacent to the closure portion 124 of the first end wall 104. The squib 140 contains a pyrotechnic material, and is actuated upon the passage of electric current between a pair of electrical connector pins 142. Such squibs also are known in the art.

The nozzle structure 102 has a frustoconical outer surface 150 centered on the axis 110 of the pressure vessel 100. The nozzle structure 102 also has a plurality of annular inner edge surfaces 152 defining a plurality of circular nozzles 154. The nozzles 154 are arranged in an array extending circumferentially around the axis 110, and are thus arranged to direct inflation fluid radially outward from the pressure vessel 100 entirely around the axis 110.

The inflator 14 is supported by the reaction canister 16 as shown in FIGS. 1 and 2. As shown in FIG. 2, the inflator 14 is received through the elliptical opening 86 in the second side wall 64 of the inner canister portion 26. The nozzle structure 102 and an adjacent portion 158 of the container wall 108 are thus located in the inner compartment 88, with the circumferential array of nozzles 154 and the container wall 108 being centered on the axis 72. The frustoconical outer surface 150 of the nozzle structure 102 mates with the frustoconical inner surface 74 of the first side wall 62 of the inner canister portion 26.

As further shown in FIG. 2, the length of the inflator 14 extending along the axis 72 is nearly equal to the distance between the first and second side walls 34 and 36 of the outer canister portion 24. Since the second side wall 64 of the inner canister portion 26 is spaced from the second side wall 36 of the outer canister portion 24 a substantial distance along the axis 72, as described above, a major length portion 160 of the inflator 14 extends outward from the elliptical opening 86 along the axis 72. The major length portion 160 of the inflator 14 includes the second end wall 106 of the pressure vessel 100, a portion 162 of the container wall 108, and the pressure sensor 130 (FIG. 3). The portion 162 of the container wall 108 which is thus located outside of the reaction canister 16 is longer than the portion 158 which is located in the inner compartment 88.

A retainer strap 164, which may be formed of metal or plastic, extends around the container wall 108 in the groove 120. The retainer strap 164 is fixed to the first mounting wall portion 90 of the reaction canister 16 by a fastener 166 and a nut 168, as shown in FIG. 2. The inflator 14 is thus secured to the reaction canister 16 by the retainer strap 164. Importantly, the retainer strap 164 blocks the inflator 14 from moving outward along the axis 72 from the position shown in FIG. 2. The frustoconical outer surface 150 of the nozzle structure 102 is thus held firmly against the frustoconical inner surface 74 of the first side wall 62 of the inner canister portion 26. Also, the container wall 108 of the pressure vessel 100 fits tightly against the lip portion 80 of the second side wall 64. The inflator 14 thus seals the inner compartment 88 at the openings 78 and 86 in the side walls 62 and 64. Alternatively, gaskets or the like could be provided to seal the openings 78 and 86.

Figures 4, 5:
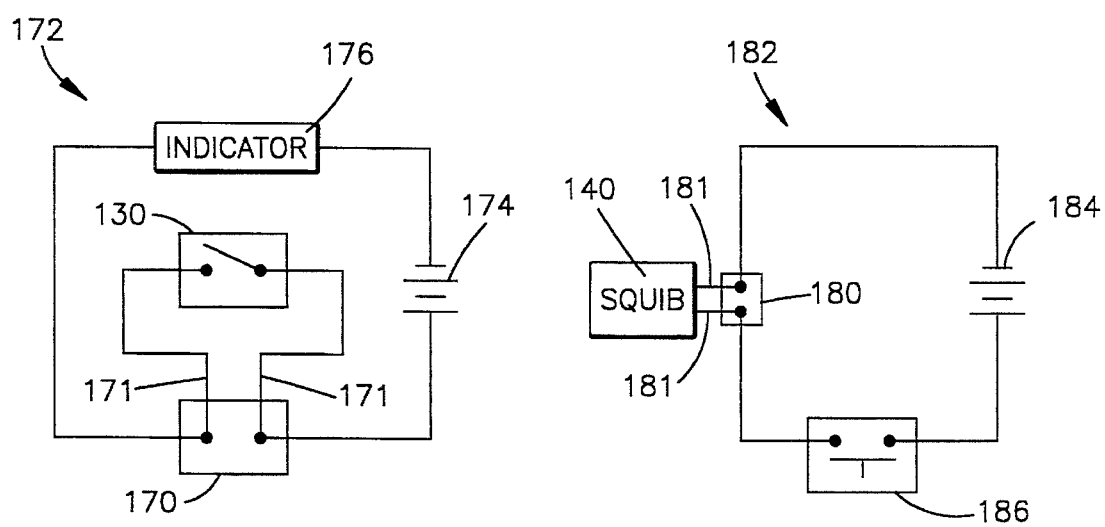
FIG. 4 is a schematic view of other parts of the apparatus of FIG. 1.
FIG. 5 also is a schematic view of other parts of the apparatus of FIG. 1.

When the inflator 14 is secured to the reaction canister 16 as described above, the air bag module 18 can be mounted in the instrument panel of the vehicle. A first terminal connector 170 with a pair of lead wires 171 is then connected to the connector pins 132 on the pressure switch 130. The pressure switch 130 is thus connected in an electrical circuit 172 which includes the second terminal connector 170, as shown schematically in FIG. 4. The electrical circuit 172 includes a power source 174 which is preferably the vehicle battery or a capacitor. The electrical circuit 172 further includes an indicator 176 which may comprise a lamp on the vehicle instrument panel. When the pressure switch 130 closes upon sensing that the fluid pressure in the storage chamber 112 has dropped to the predetermined low level, the electrical circuit 172 directs electric current through the indicator 176 to actuate the indicator 176. The indicator 176 then alerts an occupant of the vehicle that the fluid pressure in the storage chamber 112 has dropped to the predetermined low level.

In accordance with the foregoing feature of the present invention, a great degree of access is provided to the pressure switch 130 for connection of the first terminal connector 170 because the major length portion 160 of the inflator 14, which contains the pressure switch 130, is located outside of the reaction canister 16. Therefore, the reaction canister 16 does not substantially block access to the pressure switch 130 in the limited space available within the structure of the vehicle instrument panel.

A second terminal connector 180 with a pair of lead wires 181 is similarly connected to the connector pins 142 on the squib 140. The squib 140 is thus connected in an electrical circuit 182 which includes the second terminal connector 180, as shown schematically in FIG. 5. Like the electrical circuit 172, the electrical circuit 182 includes a power source 184 which is preferably the vehicle battery or a capacitor. The electrical circuit 182 further includes a deceleration sensor 186. The deceleration sensor 186 senses vehicle deceleration, and includes a switch. When the deceleration sensor 186 senses vehicle deceleration of a magnitude and duration indicative of a collision for which inflation of the air bag 12 is desired to restrain an occupant of the vehicle, it closes a switch to complete the circuit 182. When the circuit 182 is completed, it directs electric current to the squib 140 through the first terminal connector 180 to actuate the squib 140.

When the squib 140 is actuated, the pyrotechnic material in the squib 140 is ignited and produces combustion products which are expelled from the squib 140 in a direction extending along the axis 110 of the pressure vessel 100. The combustion products expelled from the squib 140 move against the closure portion 124 of the pressure vessel 100 and rupture the closure portion 124 to release the inflation fluid from the storage chamber 112. The combustion products expelled from the squib 140 also move into the storage chamber 112 and ignite the body of gas generating material 114 in the storage chamber 112. Alternatively, other means may be used to ignite the gas generating material 114. The gas generating material 114, when ignited, produces additional combustion products, including a large volume of gas, which heat the inflation fluid that was originally contained under pressure in the storage chamber 112.

The nozzle structure 102 directs the inflation fluid to flow radially outward from the pressure vessel 100 throughout the entire circumferential array of nozzles 154. The inflation fluid thus flows into the inner compartment 88 in the reaction canister 16 in a direction extending toward the outer compartment 42 and the air bag 112, and also in directions extending radially toward the major wall 60 of the inner canister portion 26. As the pressure of the inflation fluid increases in the inner compartment 88, the major wall 60 and the opposite side walls 62 and 64 of the inner canister portion 26 direct the inflation fluid to flow from the inner compartment 88 to the outer compartment 42 and the air bag 12.

The second side wall 64 of the inner canister portion 26 is designed to direct the inflation fluid to flow into the outer compartment 42 in a direction extending from the first section 44 of the outer compartment 42 toward the second section 48 of the outer compartment 42. Specifically, the inflation fluid flowing against the second side wall 64 is deflected by the second side wall 64 to turn toward a direction which is parallel to the second side wall 64. The second side wall 64 thus directs the inflation fluid to flow from the inner compartment 88 into the outer compartment 42 in a direction which is parallel to the second side wall 64. Since the second side wall 64 extends transversely relative to the axis 72 at an acute angle of approximately 45°, it directs the inflation fluid to enter the outer compartment 42 at that angle, and thus directs the inflation fluid to flow through the outer compartment 42 from the first section 44 to the second section 48. As a result, the inflation fluid flows into the air bag 12 evenly throughout the entire outer compartment 42 so that the air bag is inflated evenly by the inflation fluid.

From the above description of the invention, those skilled in the art will perceive improvements, changes and modifications. For example, rather than being part of an air bag module like the air bag module 18, the reaction canister 16 could alternatively be constructed as a portion of the vehicle structure, such as the vehicle instrument panel, upon which the air bag 12 is to be supported in the vehicle. Such improvements, changes and modifications within the skill of the art are intended to be covered by the appended claims.

Having described the invention, the following is claimed:

1. Apparatus for use in inflating an inflatable vehicle occupant restraint, said apparatus comprising:

inflator means for providing a pressure vessel for containing inflation fluid, said pressure vessel including an elongated container wall having first and second longitudinally opposite end portions, said inflator means further including means for defining a nozzle for directing inflation fluid from said inflator means, said nozzle being located adjacent to said first end portion of said container wall;

pressure sensing means for sensing the pressure of inflation fluid contained in said pressure vessel, said pressure sensing means comprising a pressure sensor connected to said pressure vessel adjacent to said second end portion of said container wall; and canister means for supporting the vehicle occupant restraint and said inflator means in a vehicle, said canister means having an outer portion defining an outer compartment for containing the vehicle occupant restraint, said outer portion of said canister means having first and second side walls defining respective opposite ends of said outer compartment;

said canister means further having an inner portion defining an inner compartment containing said nozzle and said first end portion of said container wall, said inner portion of said canister means having first and second side walls defining respective opposite ends of said inner compartment, said second side wall of said inner portion of said canister means having an opening extending through said second side wall;

said container wall extending longitudinally through said opening from said inner compartment to the exterior of said canister means, said second end portion of said container wall and said pressure switch being located outside of said canister means.

2. Apparatus as defined in claim 1 wherein said container wall has a portion located in said inner compartment and a portion located outside of said canister means, said portion located outside of said canister means being longer than said portion located in said inner compartment.

3. Apparatus for supporting an inflatable vehicle occupant restraint and an inflator structure in a vehicle, the inflator structure having an elongated container wall with first and second longitudinally opposite end portions, the inflator structure further having a nozzle for directing inflation fluid from the inflator structure to inflate the vehicle occupant restraint, the nozzle being located adjacent to the first end portion of the container wall, said apparatus comprising:

a canister having an outer portion including means for defining an outer compartment for receiving the vehicle occupant restraint, said outer portion of said canister having first and second side walls defining respective opposite ends of said outer compartment;

said canister having an inner portion including means for defining an inner compartment, said inner portion of said canister having first and second side walls defining respective opposite ends of said inner compartment;

said canister further including means for supporting the inflator structure with the nozzle and the first end portion of the container wall being located in said inner compartment, and with the second end portion of the container wall being located outside of said canister;

said means for supporting the inflator structure defining an opening through which the container wall can extend longitudinally from said inner compartment to the exterior of said canister, said opening extending through said second side wall of said inner portion of said canister and being located intermediate said side walls of said outer portion of said canister;

said canister having a transverse center line located midway between said side walls of said outer portion of said canister, both of said side walls of said inner portion of said canister being located intermediate said transverse center line and said first side wall of said outer portion of said canister.

4. Apparatus for use in inflating an inflatable vehicle occupant restraint, said apparatus comprising:

inflator means for providing a source of inflation fluid for inflating the vehicle occupant restraint, said inflator means including an inflator structure having an elongated container wall with first and second longitudinally opposite end portions, said inflator structure including means for defining a nozzle for directing inflation fluid from said inflator structure, said nozzle being located adjacent to said first end portion of said container wall; and canister means for supporting the vehicle occupant restraint and said inflator structure in a vehicle, said canister means having an outer portion defining an outer compartment for containing the vehicle occupant restraint, said outer portion of said canister means having first and second side walls defining respective opposite ends of said outer compartment;

said canister means further having an inner portion defining an inner compartment containing said nozzle and said first end portion of said container wall, said inner portion of said canister means having first and second side walls defining respective opposite ends of said inner compartment, said second side wall of said inner portion of said canister means having an opening extending through said second side wall, said opening being located intermediate said side walls of said outer portion of said canister means;

said container wall extending longitudinally through said opening from said inner compartment to the exterior of said canister means, said second end portion of said container wall being located outside of said canister means;

said canister having a transverse center line located midway between said side walls of said outer portion of said canister means, both of said side walls of said inner portion of said canister means being located intermediate said transverse center line and said first side wall of said outer portion of said canister means.

5. Apparatus for use in inflating an inflatable vehicle occupant restraint, said apparatus comprising:

inflator means for providing a pressure vessel for containing inflation fluid, said pressure vessel including an elongated container wall having first and second longitudinally opposite end portions, said inflator means further including means for defining a nozzle for directing inflation fluid from said inflator means, said nozzle being located adjacent to said first end portion of said container wall;

pressure sensing means for sensing the pressure of inflation fluid contained in said pressure vessel, said pressure sensing means comprising a pressure sensor connected to said pressure vessel adjacent to said second end portion of said container wall; and canister means for supporting the vehicle occupant restraint and said inflator means in a vehicle, said canister means having an outer portion defining an outer compartment for containing the vehicle occupant restraint, said outer portion of said canister means having first and second side walls defining respective opposite ends of said outer compartment;

said canister means further having an inner portion defining an inner compartment containing said nozzle and said first end portion of said container wall, said inner portion of said canister means having first and second side walls defining respective opposite ends of said inner compartment, said second side wall of said inner portion of said canister means having an opening extending through said second side wall;

said container wall extending longitudinally through said opening from said inner compartment to the exterior of said canister means, said second end portion of said container wall and said pressure switch being located outside of said canister means;

said canister means having a transverse center line located midway between said side walls of said outer portion of said canister means, both of said side walls of said inner portion of said canister means being located intermediate said transverse center line and said first side wall of said outer portion of said canister means.

6. Apparatus for supporting an inflatable vehicle occupant restraint and an inflator structure in a vehicle, the inflator structure having an elongated container wall and a nozzle for directing inflation fluid from the inflator structure to inflate the vehicle occupant restraint, said apparatus comprising:

a canister having an outer portion including means for defining an outer compartment for receiving the vehicle occupant restraint, said outer portion of said canister having first and second outer side walls defining respective opposite ends of said outer compartment;

said canister having an inner portion including means for defining an inner compartment for receiving the inflator structure, said inner portion of said canister having first and second inner side walls defining respective opposite ends of said inner compartment, said first inner side wall having an opening extending through said first inner side wall, said second inner side wall extending at an acute angle to said first inner side wall and having an elliptical opening extending through said second inner side wall;

said inner side walls comprising means for supporting the inflator structure in a position extending perpendicular to and between said outer side walls, and further extending outward from said inner compartment through said openings in said inner side walls.

7. Apparatus as defined in claim 6 wherein said angle is 45°.

8. Apparatus for use in inflating an inflatable vehicle occupant restraint, said apparatus comprising:

inflator means for providing a source of inflation fluid for inflating the vehicle occupant restraint, said inflator means including an inflator structure having an elongated container wall and nozzle means for directing inflation fluid from said inflator structure to inflate the vehicle occupant restraint; and canister means for supporting the vehicle occupant restraint and said inflator structure in a vehicle, said canister means having an outer portion defining an outer compartment for receiving the vehicle occupant restraint, said outer portion of said canister means having first and second outer side walls defining respective opposite ends of said outer compartment;

said canister means further having an inner portion defining an inner compartment for receiving said inflator structure, said inner portion of said canister means having first and second inner side walls defining respective opposite ends of said inner compartment, said first inner side wall having an opening extending through said first inner side wall, said second inner side wall extending at an acute angle to said first inner side wall and having an elliptical opening extending through said second inner side wall;

said inflator structure extending perpendicular to and between said outer side walls, said inflator structure further extending outward from said inner compartment through said openings in said inner side walls.

9. Apparatus as defined in claim 8 wherein said container wall has a portion located in said inner compartment and a portion located outside of said canister means, said portion located outside of said canister means being longer than said portion located in said inner compartment.

10. Apparatus as defined in claim 8 wherein said angle is 45°.

11. Apparatus for use in inflating an inflatable vehicle occupant restraint, said apparatus comprising:

an inflator structure having a elongated container wall with first and second longitudinally opposite end portions, said inflator structure including means for defining a nozzle for directing inflation fluid from said inflator structure, said nozzle being located adjacent to said first end portion of said container wall; and canister means for supporting the vehicle occupant restraint and said inflator structure in a vehicle, said canister means having an outer portion defining an outer compartment for containing the vehicle occupant restraint, said outer portion of said canister means further defining a deployment opening through which the vehicle occupant restraint is inflatable outward from said outer compartment;

said outer portion of said canister means including a base wall and first and second outer side walls, said outer side walls defining respective opposite ends of said outer compartment, said base wall extending from said second outer side wall toward said first outer side wall, said base wall being opposed to said deployment opening and thereby defining an inner boundary of said outer compartment opposite said deployment opening;

said canister means further having an inner portion defining an inner compartment containing said nozzle and said first end portion of said container wall, said inner portion of said canister means including first and second inner side walls defining respective opposite ends of said inner compartment, said second inner said wall having an opening extending through said second inner side wall;

said container wall extending longitudinally through said opening from said inner compartment to the exterior of said canister means and thereby having an exterior portion located outside of said canister means, said exterior portion of said container wall extending behind said outer portion of said canister means alongside said base wall from said opening toward said second outer side wall, said second end portion of said container wall being located outside of said canister means alongside said base wall.

12. Apparatus as defined in claim 11 wherein said base wall has a mounting portion, said apparatus further comprising retainer means for securing said inflator structure to said canister means, said retainer means connecting said second end portion of said container wall to said mounting portion of said base wall.

* * * * *